United States Patent [19]

Ohki et al.

[11] Patent Number: 4,951,550
[45] Date of Patent: Aug. 28, 1990

[54] BRAKE BOOSTER WITH KEY MEMBER HAVING AN ELASTIC MEMBER

[75] Inventors: Junichi Ohki; Shintaro Uyama, both of Saitama, Japan

[73] Assignee: Jidosha Kiki Co., Ltd., Tokyo, Japan

[21] Appl. No.: 263,642

[22] Filed: Oct. 27, 1988

[30] Foreign Application Priority Data

Oct. 30, 1987 [JP] Japan .................. 62-166697

[51] Int. Cl.⁵ .................................... F15B 9/10
[52] U.S. Cl. .................................... 91/369.3; 403/155; 403/326
[58] Field of Search .................. 91/369.3, 369.2, 369.1; 403/155, 154, 326; 92/84

[56] References Cited

U.S. PATENT DOCUMENTS

| | | | |
|---|---|---|---|
| 3,110,031 | 11/1963 | Price | 60/54.5 |
| 3,172,334 | 3/1965 | Wuellner et al. | 91/369 |
| 4,437,390 | 3/1984 | Ohta | 92/84 |
| 4,472,997 | 9/1984 | Ohmi | 91/369.3 X |
| 4,587,885 | 5/1986 | Boehm et al. | 91/369.2 X |
| 4,843,948 | 7/1989 | Sugiura et al. | 91/376 R X |
| 4,846,047 | 7/1989 | Uyama et al. | 91/169.1 X |

OTHER PUBLICATIONS

Drawings from U.S. application Ser. No. 07/868,816, filed May 29, 1986 (3 sheets).

Primary Examiner—Edward K. Look
Assistant Examiner—John E. Ryznic
Attorney, Agent, or Firm—Flynn, Thiel, Boutell & Tanis

[57] ABSTRACT

A brake booster is disclosed which reduces an idle stroke of an input shaft. A key member which is mechanically coupled to a valve plunger which forms part of a valve mechanism is provided with an elastic member so that when the brake booster is inoperative, the elastic member on the key member abuts against a shell and a valve body, respectively, thereby limiting a retracting movement of the valve body. Under this condition, a retracting movement of the key member is allowed by an elastic deformation of the elastic member if the input shaft is pulled rearward to cause a retracting movement of the valve plunger and the key member.

5 Claims, 3 Drawing Sheets

BRAKE BOOSTER WITH KEY MEMBER HAVING AN ELASTIC MEMBER

FIELD OF THE INVENTION

The invention relates to a brake booster, and more particularly, to a brake booster in which the idle stroke of an input shaft is reduced.

DESCRIPTION OF THE PRIOR ART

A brake booster is known in the art which comprises a power piston disposed within a shell for movement back and forth, a valve mechanism received in a valve body located within an axial portion of the power piston, an input shaft connected to a valve plunger, which forms part of the valve mechanism, for switching a fluid path within the valve mechanism, and a member disposed within the valve body so as to be reciprocable within a limited range and mechanically coupled to the valve plunger, the key member being disposed for abutment against the shell when the brake booster is inoperative. When the key member abuts against the shell, the valve plunger is maintained at an advanced position with respect to the valve body to reduce the idle stroke of the input shaft.

In a brake booster of the kind described, when the key member abuts against the shell to maintain the valve plunger at an advanced position with respect to the valve body, the key member cannot move further rearward as a result of its abutment against the shell while the valve plunger which is mechanically coupled to the key member is capable of undergoing a retracting movement if the key member does not constrain such retracting movement of the valve plunger.

Such condition prevails not only when the brake booster is inoperative in which a fluid pressure is introduced into the booster, but also occurs when the brake booster is not connected to a source of fluid pressure, for example, before the brake booster is mounted on a vehicle or when the brake booster is removed from a vehicle. When the brake booster is removed from a vehicle, the input shaft may be gripped by hand with the shell depending therefrom in order to carry about the brake booster. In such situation, the key member cannot retract further as a result of its abutment against the shell as mentioned previously, but the valve plunger is allowed to further retract together with the input shaft, whereby the key member may become flexed to undergo a permanent deformation as the valve plunger retracts. It will be appreciated that a permanent deformation of the key member prevents the achievement of reducing the lost stroke of the input shaft.

Such difficulty may be overcome by increasing the rigidity of the key member to prevent it from becoming flexed, or by changing the material of the key member which is effective to prevent such permanent deformation if the key member becomes flexed. However, such changes result in an increased weight or an increased cost.

SUMMARY OF THE INVENTION

In view of the foregoing, in accordance with the invention, the key member is provided with an elastic member so that the elastic member may be brought into abutment against the shell at least when the brake booster is not connected with a source of fluid pressure and the valve body is disposed in abutment against the elastic member to limit a retracting movement of the valve body. When an input shaft is pulled rearwardly under this condition to cause a retraction movement of the valve plunger and the key member, the elastic member is caused to experience an elastic deformation to permit a retracting movement of the key member.

With this arrangement, when the valve plunger retracts as a result of the input shaft being pulled rearward as when the brake booster is carried about by suspending the shell while gripping the input shaft, a displacement of the key member in the rearward direction is permitted while causing an elastic deformation of the elastic member while allowing the elastic member to limit the retracting movement of the valve body. In this manner, a curvature of the key member may be eliminated or minimized depending on a rearward travel of the key member with respect to the valve body, thus satisfactorily preventing a permanent deformation of the key member while avoiding the use of an expensive material therefor in order to increase its rigidity.

Other objects, features and advantages of the invention will become apparent from the following description of embodiments thereof with reference to the drawings.

DETAILED DESCRIPTION OF EMBODIMENTS

Figure 1:
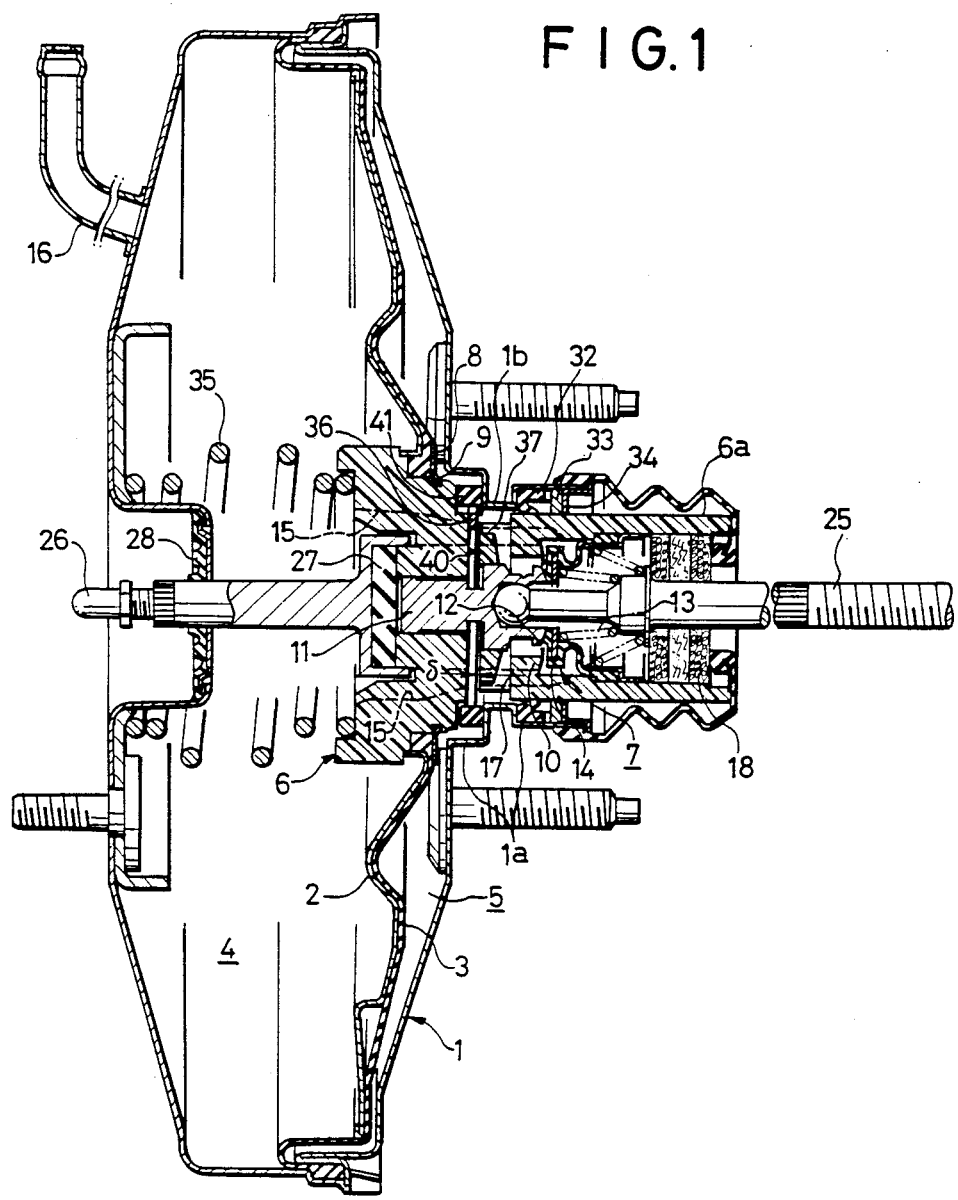
FIG. 1 is a longitudinal section of one embodiment of the invention.

Referring to the drawings, several embodiments of the invention will now be described. The brake booster includes a shell 1 in which a power piston 2 is slidably disposed. A diaphragm 3 is applied to the back surface of the power piston 2, and a combination of the power piston 2 and the diaphragm 3 divides the interior of the shell 1 into a forwardly disposed, constant pressure chamber 4 and a rearwardly disposed, variable pressure chamber 5. An axial portion of the power piston 2 is integrally formed with a valve body 6, which contains a valve mechanism 7 for switching a fluid path.

The inner periphery of the diaphragm 3 is supported by a retainer 8 which is fitted around the valve body 6. The inner periphery of the retainer 8 is engaged with an annular groove 9 formed in the outer peripheral surface of the valve body 6, thus preventing the disengagement of the retainer 8 from the valve body 6.

The valve mechanism 7 comprises a first valve seat 10 formed on the valve body 6, a second valve seat 12 formed on a valve plunger 11, and a valve element 14 which is adapted to be seated upon either valve seat 10, 12 from the rear side of the power piston 2, or from the right-hand side, as viewed in FIG. 1, under the resilience of a spring 13. A region outside a seal defined between the first valve seat 10 and the valve element 14 communicates with the constant pressure chamber 4 through a passage 15 formed in the valve body 6, and the chamber communicates with a source of negative pressure such as an intake manifold of an engine through a piping 16 mounted on the shell 1 which serves introducing a negative pressure. A region intermediate the seal defined between the first valve seat 10 and the valve element 14 and another seal defined between the second valve seat 12 and the valve element 14 communicates with the variable pressure chamber 5 through a passage 17 formed in the valve body 6. A region located inside the seal between the second valve seat 12 and the valve element 14 communicates with the atmosphere through a filter 18.

The valve plunger 11 which forms part of the valve mechanism 7 is connected to an input shaft 25 which is mechanically coupled to a brake pedal, not shown, and the front end face of the valve plunger 11 is disposed in opposing relationship with a reaction disc 27 received in a recess formed in one end of an output shaft 26. The output shaft 26 extends through a seal member 28 to the outside of the shell 1 for connection with a piston of a master cylinder, not shown.

A rear central portion of the shell 1 is formed with a cylindrical extension 1a which extends axially rearward, and which is integrally formed with an annular bulge 1b at a location toward the front end, as viewed along the axial length of the cylindrical extension 1a, and extending radially inward around its circumference. It is to be noted that the internal peripheral surface of the annular bulge 1b is located as close to the outer peripheral surface of the valve body 6 as possible. The cylindrical extension 1a has an inner diameter at a location forwardly of the annular bulge 1b which is greater than the inner diameter thereof at a location rearward of the annular bulge 1b.

Disposed within the cylindrical extension 1a at a position rearward of the annular bulge 1b are a seal member 32 which is disposed in sliding contact with the cylindrical portion 6a of the valve body 6 to maintain a hermetic seal against the exterior, and a bearing 33 which is disposed in sliding contact with the cylindrical portion 6a to support it, in a sequential manner as viewed from the front side. The seal member 32 and the bearing 33 are secured in place by a retainer 34 which is fitted into the cylindrical extension 1a from the rear side of the bearing 33.

The power piston 2 and the valve body 6 are normally maintained in their inoperative position shown by a return spring 35, and when disposed, a key member 36 which is effective to prevent the withdrawal of the valve plunger 11 from the valve body 6 is disposed in abutment against the left end face of the annular bulge 1b to limit a free movement to the right of the valve plunger 11 with respect to the valve body 6, so that a switching of a fluid circuit takes place immediately by the valve mechanism 7 whenever the input shaft 25 and the valve plunger 11 are operated for the next time.

Because the inner peripheral surface of the annular bulge 1b is disposed close to the outer peripheral surface of the valve body 6, a depression 37 is formed in the outer periphery of the valve body 6 in the region of an opening of the passage 17 to secure a sufficient channel area between the passge 17 and the variable pressure chamber 5.

Figure 2:
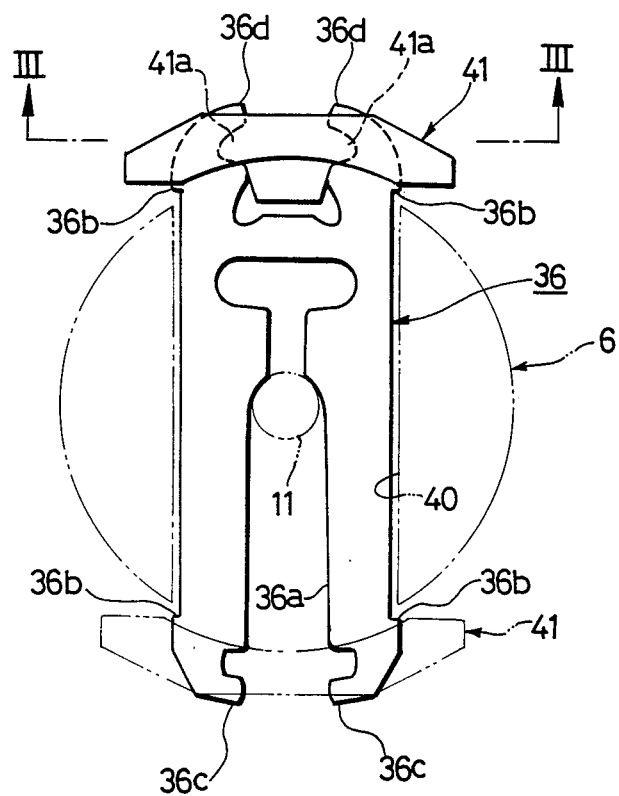
FIG. 2 is a front view of a key member 36.

As shown in FIG. 2, the key member 36 is generally rectangular in configuration, and is inserted into a through opening 40 (see FIG. 1) formed diametrically within the valve body 6 to enable its axial movement within a limited extent. The key member 36 is formed with a slit 36a which extends lengthwise from the center thereof to one end thereof and in which a portion of the valve plunger 11 having a reduced diameter is engaged to prevent the withdrawal of the valve plunger 11 from the valve body 6.

On each end of a long side of the key member 36, the latter is formed with an ear 36b which extends in a direction perpendicular to the length of the long side to engage the valve body 6 at each end of the through opening 40. When inserting the key member 36 into the through opening 40, a pair of ears 36b which are disposed adjacent to the opening of the slit 36a are compressed together to allow the respective limbs of the key member to be passed through the opening 40 until the pair of ears move past the opening 40, whereupon the pair of ears 36b are allowed to spread apart under its own resilience, thus allowing the individual ears 36b to be engaged with the valve body 6 to prevent the withdrawal of the key member 36 from the valve body 6.

Adjacent to the opening of the slit 36a, the key member is formed with a pair of opposing tabs 36c while at the opposite end from the opening of the slit 36a, the key member is also formed with a pair of tabs 36d which are equivalent to the tabs 36c, with a pair of elastic members 41 fitted around the respective pairs of tabs 36c, 36d.

Figure 3:
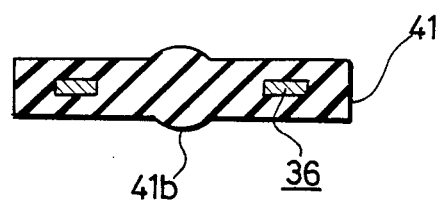
FIG. 3 is a cross section taken along the line III—III shown in FIG. 2.

Referring to FIG. 3 together with FIG. 2, it will be seen that each elastic member 41 is fitted around the respective pair of tabs 36c or 36d so as to enclose them therein, and includes a pair of steps 41a which are engaged with the respective pair of tabs 36c or 36d to prevent the disengagement of the elastic member 41 from the key member 36.

Each elastic member 41 includes a pair of projections 41b which are located intermediate the pair of steps 41a and which project from the opposite lateral sides thereof. When the brake booster is inoperative, the projection 41b on one side is disposed in abutment against the left end face of the annular bulge 1b to limit the retracting movement of the key member 36 while the projection 41b on the other side is disposed in abutment against the valve body 6 to limit the retracting movement of the valve body 6. Under this condition, the resilience of the elastic member 41 allows the key member 36 to be maintained at a position which is axially central with respect to the projections 41b.

Describing the operation of the above arrangement, when a brake pedal, not shown, is depressed to move the input shaft 25 and the valve plunger 11 to the left, the valve element 14 is seated upon the first valve seat 10 on the valve body 6 to interrupt a communication between the chambers 5 and 4 while the second valve seat 12 on the valve plunger 11 moves away from the valve element 14 to establish a communication between the chamber 5 and the atmosphere. This allows the atmosphere to be introduced into the chamber 5, allowing power piston 2 to be driven forward by a pressure differential thereacross against the resilience of the return spring 35 in a similar manner as occurs in a conventional brake booster, thus performing a braking action.

If the brake pedal is now released, the second valve seat 12 on the valve plunger 11 becomes seated upon the valve element 14 to interrupt a communication between the chamber 5 and the atmosphere while the valve element 14 moves away from the first valve seat 10 to establish a communication between the chambers 5 and 4, allowing the power piston 2 to be returned to its original, inoperative position by the return spring 35.

When the elastic member 41 fitted around the key member 36 bears against the left end face of the annular bulge 1b as a result of the retracting movement of the power piston 2, the key member 36 and its associated valve plunger 11 ceases to retract while the power piston 2 and the valve body 6 continue their retracting movement until the first valve seat 10 on the valve body 6 moves close to the valve element 14 to reduce the clearance therebetween to substantially zero as the valve body 6 retracts, whereupon the movement of the valve body 6 is stopped as a result of the abutment of the valve body 6 against the elastic member 41 which is held stationary by the annular bulge 1b. Accordingly, when the input shaft 25 is driven forward for the next time, a fluid path within the valve mechanism 7 can be immediately switched.

When the brake booster is inoperative or when the elastic member 41 bears against the left end face of the annular bulge 1b to stop the retracting movement of the key member 36 and the valve plunger 11 while the valve body 6 retracts further beyond the key member 36 and the valve plunger 11 or in other words, the key member 36 and the valve plunger 11 assume their advanced positions relative to the valve body 6, the abutment of the valve body 6 against the elastic member to stop its movement occurs when the brake booster is not connected with a source of fluid pressure, for example, at a time before the brake booster is mounted on a vehicle or when the brake booster is removed from a vehicle, as mentioned previously. If the brake booster is carried about by gripping the input shaft 11 to suspend the shell 1 under this condition, it will be seen that the valve plunger 11 and the key member 36 will be driven in their retracting direction by means of the input shaft 25.

If the key member 36 is allowed to abut against the internal wall surface of the shell 1 directly as occurs in the prior art, the key member 36 will be immediately flexed, with a maximum curvature being determined by a clearance δ between the right end face of the key member 36 and the right-hand wall surface which defines the through opening 40, which prevails when the brake booster is inoperative. If the magnitude of the clearance δ is greater, a permanent deformation of the key member may be caused.

By constrast, according to the embodiment described, above, as the valve plunger 11 retracts, the retracting movement of the key member 36 accompanies an elastic deformation of the elastic member 41 while allowing the valve body 6 to be supported by the elastic member 41 to prevent its retracting movement, so that the key member 36 is allowed to retract integrally with the valve plunger 11 with respect to the valve body 6, without involving a substantial curvature.

When the elastic member 41 becomes no longer capable of elastic deformation to stop the retracting movement of the key member 36, the latter will be flexed as the valve plunger 11 retracts. However, at this time, the right end face of the key member 36 is located close to the right-hand wall surface defining the through opening 40 to reduce the magnitude of clearance δ, thus preventing an excessive curvature of the key member 36.

Stated differently, in an arrangement in which the valve body is disposed for direct abutment against the key member 36 to limit its retracting movement even though an elastic member fitted around the key member 36 is in abutment against the shell 1, as the key member 36 retracts while compressing the elastic member and without causing a curvature thereof, the valve body is allowed to retract integrally with the retracting movement of the key member, so that the key member 36 cannot retract relative to the valve body, with consequence that the curvature of the key member 36 will be as great as when no elastic member is provided, causing the likelihood that a permanent deformation may occur.

In addition, according to the embodiment, it will be evident that the occurrence of any noise upon abutment of the key member 36 against the shell 1 as well as the occurrence of any upon abutment of the valve body 6 against the key member 36 during the operation of the brake booster can be prevented by the provision of the elastic member 41.

Figure 4:
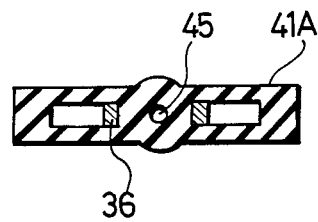
FIGS. 4 to 7 show other embodiments of the invention, specifically FIGS. 4 and 5 being cross sections corresponding to FIG. 3, and FIGS. 6 and 7 being front views corresponding to FIG. 2.
Figure 5:
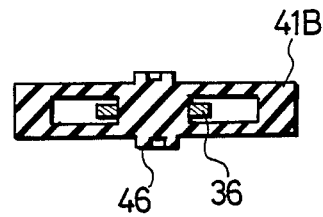

FIGS. 4 to 7 show other embodiments of the invention. In FIG. 4, a hole 45 is formed centrally in an elastic member 41A where projections are provided, promoting its elastic deformation. FIG. 5 shows a modification of the configuration of a projection 46 from an elastic member 41B.

Figure 6:
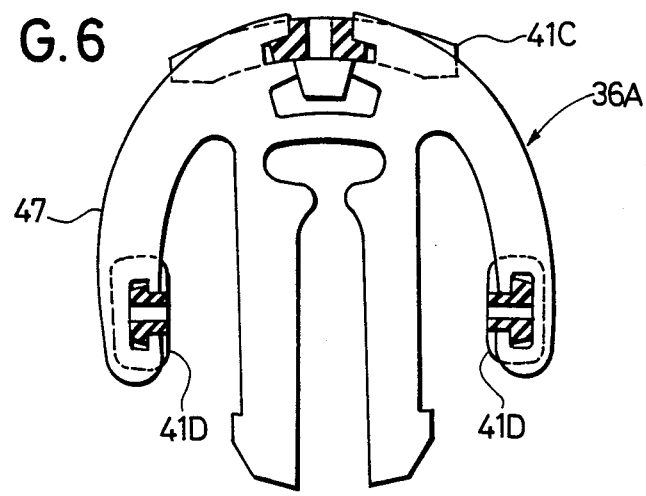
Figure 7:
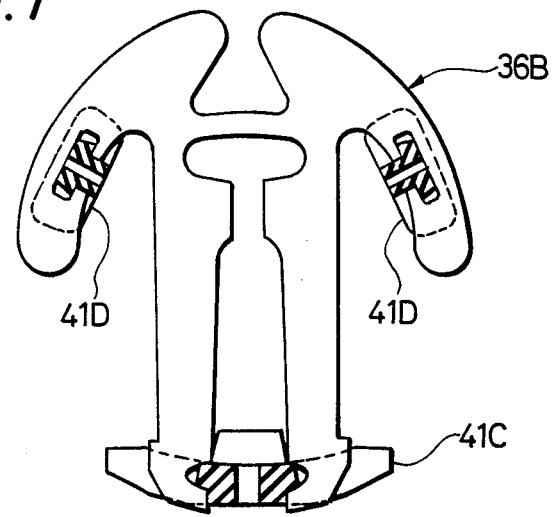

FIG. 6 shows a key member 36A which is constructed on the basis of a substantially rectangular key member 36 of the described embodiment, with a modification that the key member is integrally formed with a U-shaped portion 47 on the opposite end from the opening of the slit 36a. Elastic members 41C, 41D are disposed at three locations within the U-shaped portion 47. FIG. 7 shows a key member 36B which is a modification of the key member 36A shown in FIG. 6.

It is to be understood that a "shell" as termed herein, against which the key member 36 abuts, refers not only to a shell itself, but also any member mounted on the shell such as a reinforcing plate, a bearing or any suitable stop member, for example.

In the described embodiment, the valve body 6 is brought into abutment against the elastic member 41 to limit its retracting movement when the brake booster is inoperative. However, an arrangement is known in the prior art in which the valve body 6 is allowed to retract through a relatively increased stroke without causing it to abut against the elastic member 41 so that the movement of the valve body 6 is stopped by a servo balance, namely, by causing both the first and the second valve seat to be closed when the resilience of the return spring 35 is balanced with a pressure differential between the chambers 5 and 4, and it is to be understood that the invention is equally applicable to a brake booster of this kind.

While the invention has been described above in connection with a preferred embodiment and several modifications thereof, it should be understood that a number of changes, modifications and substitutions therein will readily occur to one skilled in the art without departing from the spirit and scope of the invention defined by the appended claims.

What is claimed is:

1. A brake booster including a power piston disposed for reciprocating motion within a shell, a valve mechanism received within a valve body which represents an axial portion of the power piston, an input shaft connected to a valve plunger which forms part of the valve mechanism for switching a fluid part within the valve mechanism, and a key member disposed for a reciprocating motion within a limited extent within the valve body and mechanically coupled to the valve plunger and disposed for abutment against the shell when the brake booster is inoperative, the valve plunger being maintained at an advanced position with respect to the valve body when the key member abuts against the shell the thereby reduce an idle stroke of the input shaft;

characterized in that the key member is provided with at least one elastic member so that the elastic member abuts against the shell at least when the brake booster is not connected with a source of hydraulic pressure and the elastic member is disposed for abutment by the valve body to limit the retracting movement of the vavle body, an arrangement being such that when the input shaft is pulled rearward under the described condition to cause a retracting movement of the valve plunger and the key member, a retracting movement of the key member is allowed by an elastic deformation of the elastic member, the key member including a substantially rectangular member having a slit therein which is disposed for engagement with the plunger, the key member including a pair of opposing ears on its opposite sides at each lengthwise end thereof, and said at least one elastic member extending across one of the pairs of ears and being centrally formed with a projection which extends in the axial direction of the valve body.

2. A brake booster according to claim 1 in which the projection is formed with a recess.

3. A brake booster according to claim 1 in which the key member comprises a U-shaped portion integrally formed with one end of the rectangular portion.

4. A brake booster according to claim 3 in which a plurality of said elastic members are provided and respectively disposed in the opposite ends as well as in the central portion of the U-shaped portion.

5. A brake booster according to claim 3 in which a plurality of said elastic members are provided and respectively disposed on both lateral sides of the U-shaped portion as well as at the other end of the rectangular portion.

* * * * *

UNITED STATES PATENT AND TRADEMARK OFFICE
CERTIFICATE OF CORRECTION

PATENT NO. : 4,951,550

DATED : August 28, 1990

INVENTOR(S) : Junichi Ohki et al

It is certified that error appears in the above-identified patent and that said Letters Patent is hereby corrected as shown below:

Col. 6, line 68; change "the" (first occurrence) to ---to---.

Signed and Sealed this

Nineteenth Day of May, 1992

Attest:

DOUGLAS B. COMER

*Attesting Officer*    Acting Commissioner of Patents and Trademarks